Feb. 16, 1943.  E. F. STUMPF  2,311,265
TWIN CLUTCH POWER TAKE-OFF DRIVE FOR TRACTORS
Filed March 5, 1941  2 Sheets-Sheet 1
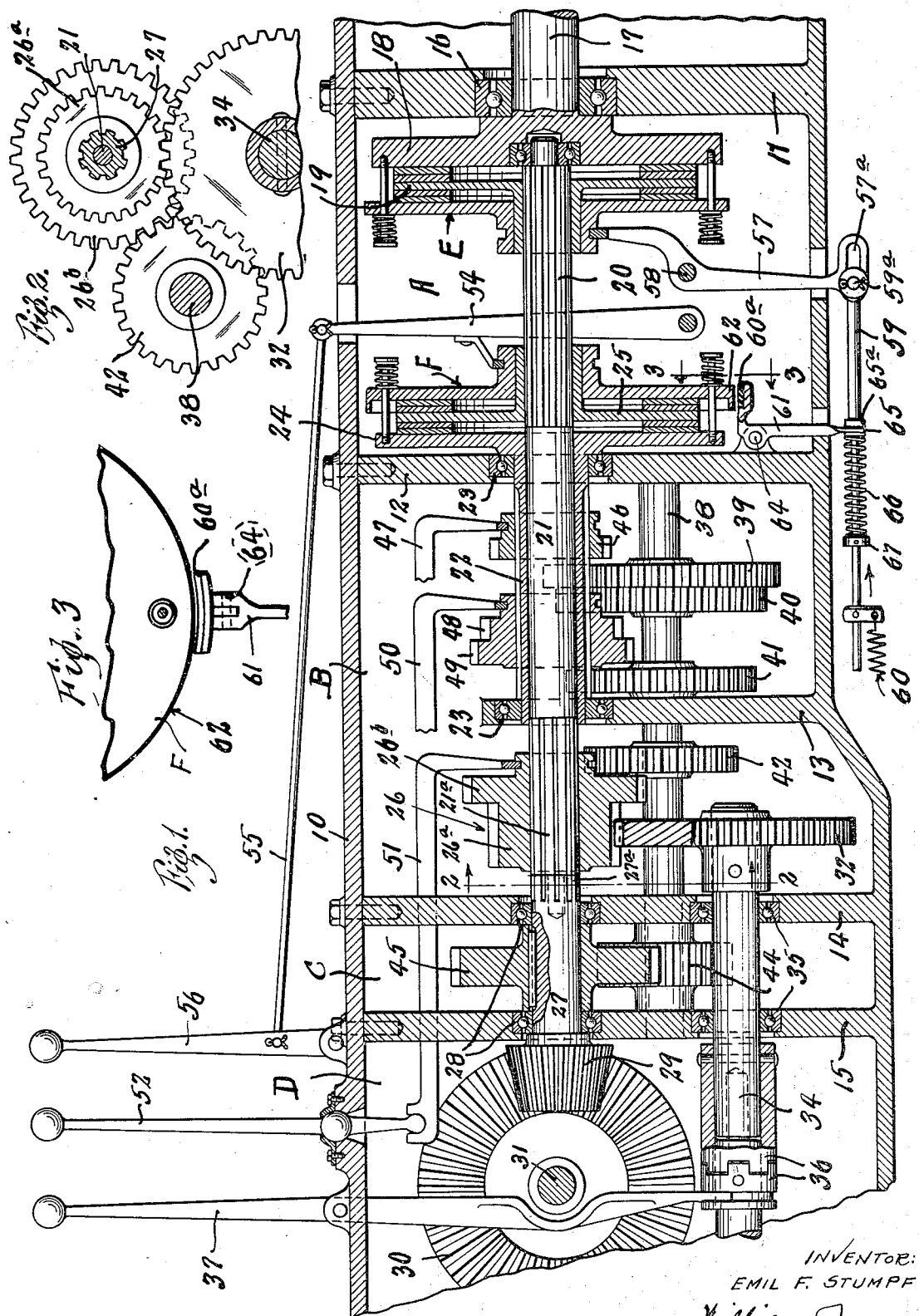
INVENTOR:
EMIL F. STUMPF
By William Janne
ATTORNEY.

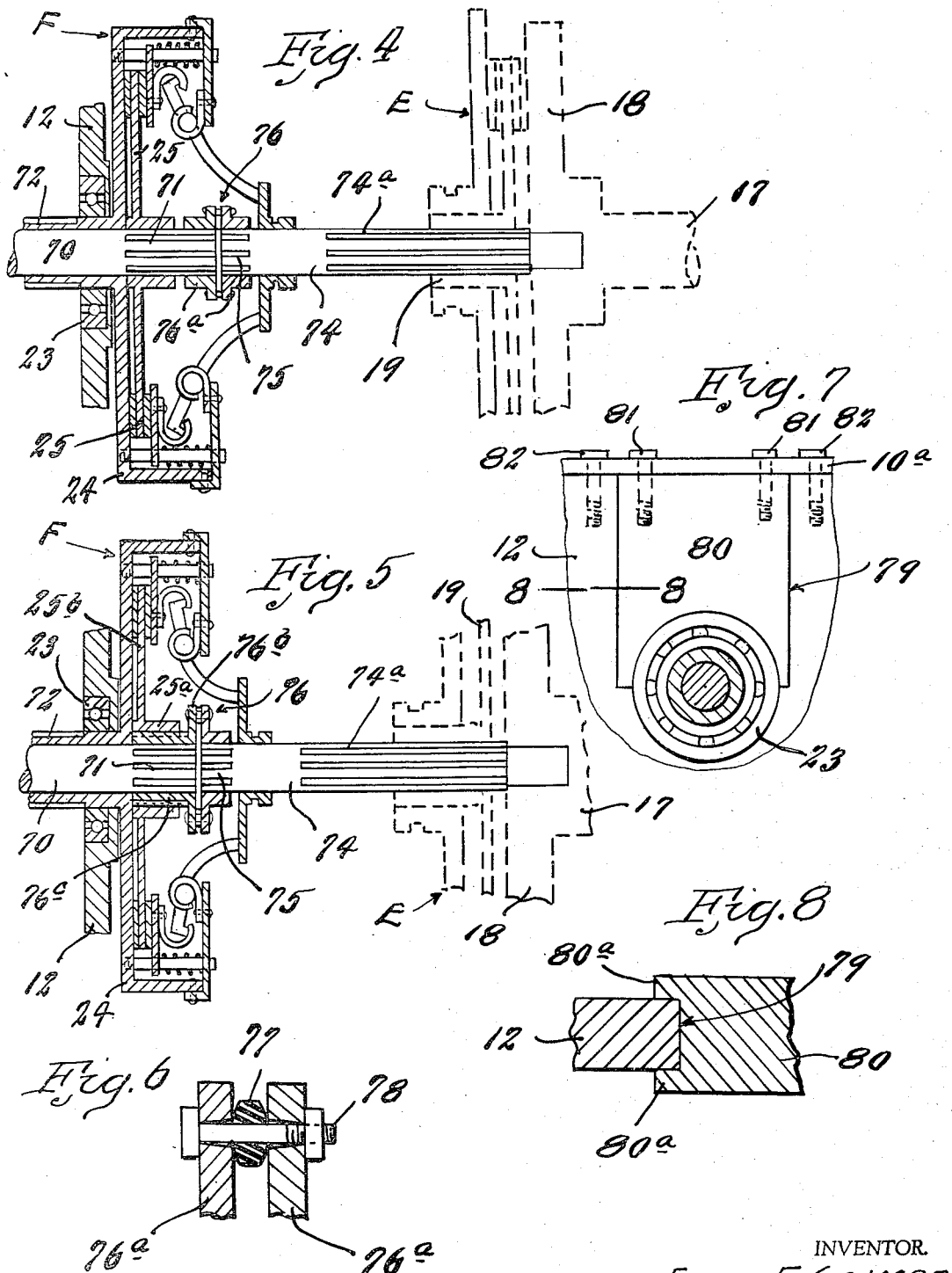

Patented Feb. 16, 1943

2,311,265

UNITED STATES PATENT OFFICE 2,311,265

TWIN CLUTCH POWER TAKE-OFF DRIVE FOR TRACTORS

Emil F. Stumpf, Valmeyer, Ill.

Application March 5, 1941, Serial No. 381,800

9 Claims. (Cl. 74—326)

This invention relates to twin clutch power takeoff drive for tractors.

Among the main objects of the present invention is the provision of a power takeoff drive for tractors having a power takeoff shaft disposed parallel with the axis of the power delivery and the transmission shafts and operable continuously while stopping or starting the tractor and adapted to be stopped simultaneously with the tractor by the operation of a single friction clutch.

Another object of the invention is to provide a tractor having the power delivery or differential drive shaft arranged in axial alignment with the engine shaft and with a pair of concentric transmission shafts interposed therebetween, a twin clutch drive for said transmission shafts, and a power takeoff shaft disposed parallel with said shafts, a suitable driving mechanism being provided to span said power takeoff gearing and establish driving connection between said transmission shafts and said power delivery shaft.

Another object of the invention is to provide a tractor having a pair of concentric shafts, each of which carries one or more selective sliding gears for engaging the transmission gears of a transmission countershaft, an engine shaft, a first friction clutch for connecting said engine shaft with said inner concentric shaft, a second friction clutch connecting said inner concentric shaft with said outer concentric shaft, and a brake mechanism adapted to engage said second friction clutch in time relation with the disengagement of said first friction clutch for braking or slowing down the rotative movement of said concentric shafts when the latter are disengaged from said engine shaft.

Another object of the invention is to provide in a tractor a pair of concentric transmission shafts disposed coaxially with the engine shaft, a first friction clutch for connecting said engine shaft with the inner one of said concentric shafts, a second friction clutch for connecting said inner shaft with the outer one of said concentric shafts, means for operating said first friction clutch, a connecting rod having lost motion operative connection with said means, and a brake operable by said rod to brake said second clutch by the operation of said first clutch, whereby said concentric shafts are retarded in their rotative movement when said first clutch is opened by said means.

Another object of the invention is to transmit the transmission drive from the transmission shafts to the differential drive shaft in spanning relation with the gearing connecting said transmission shafts with a power takeoff shaft.

Other objects of the invention are to provide an engine shaft friction clutch, a pair of concentric transmission shafts, the inner one of which is adapted to be engaged by said engine shaft clutch, a transmission friction clutch for interengaging said concentric shafts, means for operating said engine shaft clutch, and braking means operable by the first means to exert braking action against said transmission clutch and slow down said concentric shafts when said engine clutch is opened, said first means having lost motion connection with said braking means so that the latter engage the transmission clutch before said engine shaft clutch is opened.

With these and other objects in view, my invention consists in certain novel features of construction and arrangement of parts, hereinafter more fully described and claimed, and illustrated in the accompanying drawings, in which—

Figure 1 is a longitudinal vertical cross section taken through a tractor transmission casing.

Figure 2 is a cross section taken on line 2—2 of Figure 1.

Figure 3 is a detail view taken on line 3—3 of Figure 1.

Figure 4 is a detail view showing a flexible coupling interposed between the transmission shafts and the engine shaft.

Figure 5 is a modified form of a coupling.

Figure 6 is an enlarged sectional detail view showing a spacer between the coupling members.

Figure 7 shows a view of a removable bearing block.

Figure 8 is an enlarged cross section taken on line 8—8 of Figure 7.

Referring by numerals to the accompanying drawings, 10 indicates a transmission casing having an end wall 11, partition walls 12, 13 and 14, and an end wall 15 forming compartments A, B, C and D in said casing.

Journaled in a bearing 16 in end wall 11 and extending into the compartment A is an engine shaft 17 having formed integral therewith or fixed thereon a fly wheel 18. This forms a fixed or driving element of a friction clutch E, the movable or driven elements 19 being mounted on the spline portion 20 of a transmission shaft 21. This shaft is the inner member of a pair of concentric shafts and, as shown, is revolubly mounted in the outer or tubular member 22 which is journaled in bearings 23 in partition walls 12 and 13. Formed integral with or fixed on one end of shaft 22 and disposed in compartment A is a member 24 of a friction clutch F, the outer member or members 25 of which are movably mounted on the spline portion 20 of shaft 21.

Thus both of the friction clutches E and F are disposed in compartments A of casing 10 and clutch E controls the driving engagement between the engine shaft 17 and the transmission shaft 21, and clutch F controls the operative connection between shafts 21 and 22.

Shaft 21 extends into compartment B past partition wall 13 and terminates in a spline portion 21a on which is slidably mounted a double gear 26. A differential or power delivery shaft 27 extends horizontally through compartment C and is journaled in ball bearings 28 in end wall 15 and partition wall 14. One end of shaft 27 extends into chamber D and has secured thereon a bevel or power delivery pinion 29 which meshes with a beveled gear 30 of a differential drive shaft 31.

Double gear 26 is disposed in compartment B between walls 13 and 14 and consists of a comparatively wide gear 26a and a narrow gear 26b, the latter being larger in diameter than the former. The gear 26a is formed wide in order to maintain it in mesh at all times with a gear 32 fixed on one end of a power takeoff shaft 34. This shaft is disposed parallel with shaft 27, preferably therebelow, and is journaled in bearings 35 in walls 14 and 15 and extends rearwardly into compartment D. Thus when shaft 21 is operated said shaft 34 is actuated therewith. This shaft 34 is formed of two sections, a clutch 36 operated by a manual lever 37 being used to interengage and disengage said sections from each other.

Journaled in the walls 12, 13, 14 and 15 is a transmission countershaft 38 which is parallel with shafts 21 and 27 and is preferably arranged below and to one side of the same. Fixed on said shaft 38 and located in compartment B are the following transmission gears: First or low speed 39; second speed gear 40; third speed gear 41; and fourth speed gear 42. A gear 44 is fixed on said shaft 38 in compartment C and meshes with a gear 45 fixed on shaft 27, thereby providing driving connection between said shafts 38 and 27 and establishing operative connection between the transmission shafts 21 or 22 and power delivery or differential drive shaft 27 in spanning relation with the power takeoff gears 32 and 26a.

Slidably mounted on tubular shaft 22 is a selective gear 46 operable by a shifting fork 47 into and out of engagement with the gear 39 and selective gears 48 and 49 operable by a shifting fork 50 and movable into and out of engagement either with gear 40 or 41.

The double gear 26 is operated by a shifting fork 51 out of neutral position either to bring gear 26b into engagement with gear 42 or to bring the wider gear 26a into engagement with the spline portion 27a of shaft 27 to establish a direct drive between said shafts 21 and 27. A gear shift lever 52 is used to operate said forks 47, 50 and 51.

The second clutch F is actuated to disconnect the shafts 21 and 22 from each other by an arm 54 pivoted at one end in compartment A and extending outward and connected at the other end by a rod 55 to a manually operated lever 56.

The first friction clutch E is actuated by a lever 57 pivoted at 58 and having one end engaging said clutch and having the opposite end connected to a rod 59. A tension spring 60 anchored at one end (not shown) is connected at the other end to said rod and holds it in a retracted or clutch cooperating position.

In order to prevent the concentric shafts 21 and 22 and the gears carried thereby from rotating at high speed, when shaft 20 is disengaged from the revolving shaft 17, a suitable brake mechanism is provided, preferably to act on clutch F and retard or slow down the rotative movement of said shafts 21 and 22 and parts carried thereby. This brake mechanism is arranged to operate in advance of the disengagement of clutch E so as to slow down said shafts 21 and 22 and permit safe shifting of the sliding gears.

As shown, the brake mechanism comprises a brake section 60a carried by one end of a lever 61 and adapted to engage the rim 62 of clutch F. The lever 61 is pivotally mounted at 64 and has its opposite end 65 extending outwardly from the casing 10 and terminating adjacent to rod 59. An opening is formed in said end 65 to allow said rod to pass therethrough. A collar 65a is fixed on rod 59 to one side of end 65. A coiled spring 66 is placed on said rod on the opposite side of said end 65 and one end bears against said end 65 while the other end bears against a collar 67 fixed on said rod 59. When said rod is actuated in the direction indicated by arrow in Figure 1 to open clutch E, spring 66 is compressed and lever 61 is operated to apply the brake section 60a to rim 62.

To insure application of the brake before the disengagement of clutch E a lost motion connection is provided between rod 59 and lever 57. The lower end of the lever is formed with a horizontally disposed slot 57a and rod 59 carries a pin 59a which operates in said slot. The length of the slot 57a is less than the stroke of rod 59 so that lever 57 is operated during the last part of movement of said rod, while the brake mechanism is applied upon the commencement of the operating stroke of said rod 59. Thus the clutch F and shafts 21 and 22 are subjected to braking action immediately before these are disengaged from the engine shaft 17 and are prevented from gaining in speed when released. This slowing down of the transmission shafts 21 and 22 allows shifting of the sliding gears without danger of stripping.

The provision of twin friction clutches E and F provides dual control, whereby the tractor and the power takeoff shaft may be both stopped or the tractor may be stopped and the power takeoff shaft remain in operation.

To operate the power takeoff shaft and the tractor, clutch E is disengaged and clutch 36 engaged. Clutch E is then engaged, whereupon transmission shaft 21 and power takeoff shaft 34 are actuated. Clutch F is now disengaged and the desired sliding gear 46, 48, 49 or 26b is shifted from neutral into mesh with its corresponding gear of the countershaft 38. Clutch F is then engaged starting the tractor, while the power takeoff shaft 34 is in operation.

If it is desired to continue the operation of the power takeoff shaft 34 but stop the tractor, the clutch F is disengaged, thereby stopping the operation of the transmission gears driven by the tubular shaft 22. When gear 26b is in mesh with gear 42, the power takeoff shaft 34 is stopped when the tractor stops.

When it is desired to shift gears while the tractor is in motion, clutch E is disengaged by operating rod 59. This automatically applies the brake mechanism 60a and slows down transmission or concentric shafts 21 and 22 so that any one of the sliding gears 46, 48, 49 or 26b can be shifted into engagement with its corresponding gear on the transmission countershaft 38 or gear or coupling member 26a shifted into engagement with the spline portion 27a of shaft 27.

Figures 4 and 5 show forms of flexible joints which may be used between the two clutches E and F in place of the shaft end 20. The form shown in Figure 4 shows an inner transmission shaft 70 having a spline end 71. A tubular transmission shaft 72 is mounted on shaft 70 and carries member 24 of friction clutch F, while member 25 of said clutch is disposed on said spline end 71. This spline end 71 terminates short of clutch E, a short shaft section 74 being interposed therebetween. This shaft section is provided near one end with a spline portion 74a for receiving the member 19 of clutch E, the other member 18 being carried by the engine shaft 17 (said clutch E and shaft 17 being shown in dotted lines).

That end of shaft 74 which is adjacent to end 71 is splined as indicated at 75 and is connected to end 71 by a coupling or flexible joint 76. This coupling consists of two flanged members 76a, one of which is disposed on end 71 and the other on end 75. Said members 76a are spaced from each other by resilient spacers 77, preferably made of rubber. A series of bolts or rivets 78 extend through aligned apertures in the flanges of said coupling members 76a and in spacers 77 and hold said members 76a in proper spaced relation with each other, as shown in Figure 6.

Thus the shaft section 74 and engine shaft 17 may be out of alignment with shaft 71 without affecting the latter or its bearings. This is an advantageous feature as it is not always practicable to obtain or preserve perfect axial alignment between the engine shaft 17 and the transmission shafts 70 and 72 or their counterparts 21 and 22.

In the form shown in Figure 5, coupling member 76b has its hub portion 76c splined to receive the spline hub 25a of clutch member 25b, thereby providing a more compact construction.

Figures 7 and 8 show a modified form of construction for mounting the shaft bearings 23 in walls 12 and 13 and, if desired, bearings 28 in walls 14 and 15. As shown, each wall is provided with a vertically disposed slot 79 in which is disposed a removable block 80, the lower end of which is semi-circular and encircles the upper half of the respective bearing. The upper end of block 80 terminates flush with the upper end of the wall and receives bolts 81 which secure said block to a cover 10a of casing 10. This cover is removable and is held in place by bolts 82 screw-seated in the upper end of the walls of said casing 10. Preferably each block 80 is formed at its vertical sides with vertical flanges 80a which bear against the sides of the vertical edges of each slot 79 and hold the block against lateral movement. Thus by removing the cover 10a and blocks 80 the entire shaft assembly 21 and 27 can be lifted out of the casing.

This is a companion application of my copending application Serial No. 341,427, filed June 20, 1940, and Serial No. 374,734, filed January 16, 1941.

While I have shown and disclosed herein the preferred embodiment of my invention, it is obvious that various changes in the construction and arrangement of parts of my twin clutch power takeoff drive can be made without departing from the spirit of my invention.

I claim:
1. In a tractor, an engine shaft, a transmission shaft disposed coaxially with said engine shaft, a power delivery shaft disposed coaxially with said transmission shaft, a friction clutch for connecting and disconnecting said engine shaft and said transmission shaft, a tubular transmission shaft mounted on the first transmission shaft, a friction clutch for interengaging said tubular shaft with said transmission shaft, a power takeoff shaft disposed under said power delivery shaft, a transmission countershaft, gearing connecting said transmission shaft with said power takeoff shaft, gearing connecting said countershaft with said power delivery shaft, gearing for selectively interengaging said transmission shafts with said countershaft, means for disengaging said first clutch to stop both the power delivery shaft and said power takeoff shaft, and means for disengaging said second clutch to stop the operation of said power delivery shaft through the selective gearing of said tubular shaft.

2. In a tractor, an engine shaft, a transmission shaft disposed coaxially with said engine shaft, a power delivery shaft disposed coaxially with said transmission shaft, a friction clutch for connecting and disconnecting said engine shaft and said transmission shaft, a tubular transmission shaft mounted on the first transmission shaft, a friction clutch for interengaging said tubular shaft with said transmission shaft, a power takeoff shaft disposed under said power delivery shaft, a transmission countershaft gearing connecting said transmission shaft with said power takeoff shaft, gearing connecting said countershaft with said power delivery shaft, gearing for selectively interengaging said tubular shaft with said countershaft, a coupling for interengaging said transmission shaft with said power delivery shaft for a straight through drive, means for disengaging said first clutch to stop both the tractor drive and the power takeoff shaft, and means for disengaging said second clutch to stop the tractor drive through the selective gearing of said tubular shaft.

3. In a tractor, an engine shaft, a transmission shaft disposed coaxially with said engine shaft, a power delivery shaft disposed coaxially with said transmission shaft, a friction clutch for connecting and disconnecting said engine shaft and said transmission shaft, a tubular transmission shaft mounted on the first transmission shaft, a friction clutch for interengaging said tubular shaft with said transmission shaft, a power takeoff shaft disposed under said power delivery shaft, a transmission countershaft, gearing connecting said transmission shaft with said power takeoff shaft, gearing connecting said countershaft with said power delivery shaft, gearing for selectively interengaging said transmission shafts with said countershaft, means for disengaging said first clutch to stop the tractor and said power takeoff shaft, and means for disengaging said second clutch and disconnecting said tubular transmission shaft.

4. In a tractor having an engine shaft and a power delivery shaft disposed coaxially in spaced relation; of a pair of concentric shafts arranged between said first mentioned shafts, a first friction clutch for establishing driving connection between said engine shaft and the inner one of said concentric shafts, a second friction clutch for operatively connecting said inner shaft with said outer concentric shaft, a power takeoff shaft disposed parallel with said power delivery shaft and extending rearward thereof, a transmission countershaft disposed parallel with said concentric shafts, gearing connecting said countershaft with said power delivery shaft, transmission gears fixed on said countershaft, sliding gears on the outer one of said concentric shafts for selectively engaging the corresponding gears on said countershaft, a gear fixed on said power takeoff shaft, and a gear splined on the inner one of said concentric shafts and meshing at all times with said last mentioned gear, said splined gear being movable into driving engagement with said power delivery shaft to establish a straight drive between said inner shaft and said power delivery shaft.

5. In a tractor having an engine shaft and a power delivery shaft disposed coaxially in spaced relation; a pair of concentric shafts arranged between said first mentioned shafts, a first friction clutch for establishing driving connection between said engine shaft and the inner one of said concentric shafts, a second friction clutch for operatively connecting said inner shaft with said outer concentric shaft, a power takeoff shaft disposed parallel with said power delivery shaft and extending rearward thereof, a transmission countershaft disposed parallel with said concentric shafts, gearing connecting said countershaft with said power delivery shaft, transmission gears fixed on said countershaft, sliding gears on the outer end of said concentric shafts for selectively engaging the corresponding gears on said countershaft, a gear fixed on said power takeoff shaft, and a gear splined on the inner one of said concentric shafts and meshing at all times with said last mentioned gear, said splined gear being movable into driving engagement with said power delivery shaft to establish a straight drive between said inner shaft and said power delivery shaft, and means for disengaging said friction clutches independently of each other.

6. In a tractor having an engine shaft and a power delivery shaft disposed coaxially in spaced relation; of a pair of concentric shafts arranged between said first mentioned shafts, a first friction clutch for establishing driving connection between said engine shaft and the inner one of said concentric shafts, a second friction clutch for operatively connecting said inner shaft with said outer concentric shaft, a power takeoff shaft disposed parallel with said power delivery shaft and extending rearward thereof, a transmission countershaft disposed parallel with said concentric shafts, gearing connecting said countershaft with said power delivery shaft, transmission gears fixed on said countershaft, sliding gears on the outer one of said concentric shafts for selectively engaging the corresponding gears on said countershaft, a gear fixed on said power takeoff shaft, a gear splined on the inner one of said concentric shafts and meshing at all times with said last mentioned gear, said splined gear being movable into driving engagement with said power delivery shaft to establish a straight drive between said inner shaft and said power delivery shaft, and means for operating said first friction clutch to disengage said inner concentric shaft from said engine shaft.

7. In a tractor, the combination with an engine shaft and a differential drive shaft disposed in spaced coaxial relation with each other, of a pair of concentric shafts disposed between and coaxially with said first mentioned shafts, a first friction clutch forming a driving connection between said engine shaft and the inner one of said concentric shafts, a second friction clutch forming a driving connection between said inner and outer concentric shafts, a transmission countershaft, gears fixed on said countershaft, gearing connecting said countershaft with said differential drive shaft, selective gears slidably mounted on said outer concentric shaft for engaging the respective gears on said countershaft, a power takeoff shaft disposed parallel with said differential drive shaft, gearing connecting said power takeoff shaft with the inner concentric shaft, a coupling member slidably mounted on one end of said inner concentric shaft and movable into engagement with the adjacent end of said differential drive shaft to establish a direct drive therebetween, means for actuating said first clutch to break the driving connection between said engine shaft and said inner shaft, and means for actuating said second friction clutch to break the driving connection between said concentric shafts.

8. In a tractor, the combination with an engine shaft and a differential drive shaft disposed in spaced-apart coaxial relation with each other, of a pair of concentric shafts disposed coaxially with said first mentioned shafts, a friction clutch forming a driving connection between said engine shaft and the inner one of said concentric shafts, a clutch connecting said concentric shafts, a transmission countershaft, gearing connecting said countershaft with said differential drive shaft, speed change gearing adapted to connect the outer one of said concentric shafts with said countershaft, a power takeoff shaft arranged in spaced relation with said differential drive shaft, gearing connecting said power takeoff shaft with said inner concentric shaft, a coupling member splined on one end of said inner concentric shaft and movable into non-rotative engagement with the adjoining end of said differential drive shaft to establish a direct drive therebetween, and means for actuating said friction clutch to break the driving connection between said engine shaft and said inner concentric shaft.

9. In a tractor, the combination with an engine shaft and a differential drive shaft disposed in spaced-apart coaxial relation with each other, of a pair of concentric shafts disposed coaxially with said first mentioned shafts, a friction clutch forming a driving connection between said engine shaft and the inner one of said concentric shafts, a clutch connecting said concentric shafts, a transmission countershaft, gearing connecting said countershaft with said differential drive shaft, speed change gearing adapted to connect the outer one of said concentric shafts with said countershaft, a power takeoff shaft arranged in spaced relation with said differential drive shaft, gearing connecting said power takeoff shaft with said inner concentric shaft, a coupling member splined on one end of said inner concentric shaft and movable into non-rotative engagement with the adjoining end of said differential drive shaft to establish a direct drive therebetween, and means for actuating said friction clutch to break the driving connection between said engine shaft and said inner concentric shaft.

EMIL F. STUMPF.